(12) United States Patent
Zhao et al.

(10) Patent No.: US 11,375,498 B2
(45) Date of Patent: Jun. 28, 2022

(54) RESOURCE POOL DETERMINATION METHOD, AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/232,861

(22) Filed: Apr. 16, 2021

(65) Prior Publication Data
US 2021/0235432 A1 Jul. 29, 2021

Related U.S. Application Data

(63) Continuation of application No. PCT/CN2018/111949, filed on Oct. 25, 2018.

(51) Int. Cl.
*H04W 72/04* (2009.01)
*H04W 4/46* (2018.01)

(52) U.S. Cl.
CPC ........... *H04W 72/044* (2013.01); *H04W 4/46* (2018.02)

(58) Field of Classification Search
CPC . H04W 72/02; H04W 76/14; H04W 72/0446; H04W 72/04; H04W 72/042; H04W 4/40; H04W 76/23; H04W 76/27; H04W 72/044; H04W 4/46; H04W 72/0406; H04W 4/44; H04W 72/005
See application file for complete search history.

(56) References Cited

U.S. PATENT DOCUMENTS

| | | | |
|---|---|---|---|
| 2018/0160418 A1* | 6/2018 | Luo | H04W 72/1263 |
| 2019/0222982 A1* | 7/2019 | Cao | H04W 76/27 |
| 2020/0014512 A1* | 1/2020 | Ramadan | H04L 27/2695 |
| 2021/0160876 A1* | 5/2021 | Osawa | H04W 72/0453 |

(Continued)

FOREIGN PATENT DOCUMENTS

| CN | 108696935 | 10/2018 |
|---|---|---|
| WO | 2018016836 | 1/2018 |

(Continued)

OTHER PUBLICATIONS

Ericsson, "Physical layer structures of NR V2X," 3GPP TSG-RAN WG1 Meeting #94bis, Tdoc R1-1811592, Oct. 2018, 14 pages.
(Continued)

*Primary Examiner* — Allahyar Kasraian
(74) *Attorney, Agent, or Firm* — Hodgson Russ LLP

(57) ABSTRACT

Disclosed in the embodiments of the present application are a resource pool switching method, a terminal device and a communication device, the method comprising: a first terminal device acquiring first indication information; and the first terminal device, according to the first indication information, switching a sidelink resource pool from a first resource pool to a second resource pool. The method, terminal device and communication device of the embodiments of the present application facilitate improvement in the performance of sidelink communication.

12 Claims, 4 Drawing Sheets

(56) References Cited

U.S. PATENT DOCUMENTS

2021/0185674 A1* 6/2021 Zhao ............... H04W 4/40
2021/0212050 A1* 7/2021 Lu .................. H04L 5/0094
2021/0219292 A1* 7/2021 Wang ............... H04W 72/042
2021/0337426 A1* 10/2021 Lee .................. H04W 74/0816

FOREIGN PATENT DOCUMENTS

WO        2018188585       10/2018
WO    WO-2020061755 A1 *  4/2020  ........... H04W 28/16

OTHER PUBLICATIONS

Huawei et al., "Sidelink PHY structure and procedure for NR V2X," 3GPP TSG RAN WG1 Meeting #94bis, R1-1810138, Oct. 2018, 15 pages.

ZTE, "Initial consideration on NR V2X resource allocation," 3GPP TSG-RAN WG2#103bis, R2-1814168, Oct. 2018, 7 pages.

ZTE, "Discussion on LTE/NR Uu based resource allocation/configuration for NR sidelink," 3GPP TSG RAN WG1 Meeting #94, R1-1808606, Aug. 2018, 3 pages.

WIPO, International Search Report and Written Opinion for PCT/CN2018/111949, dated Jul. 24, 2019.

ZTE, "Discussion on LTE/NR Uu based resource allocation/configuration for NR sidelink," 3GPP TSG RAN WG1 Meeting #94bis, R1-1810726, Oct. 2018.

EPO, Extended European Search Report for EP Application No. 18937956.3, dated Oct. 21, 2021.

IPI, Office Action for IN Application No. 202117022383, dated Feb. 25, 2022.

EPO, Communication for EP Application No. 18937956.3, dated May 6, 2022.

ISDEC, Office Action for CA Application No. 3117387, dated May 4, 2022.

* cited by examiner

RESOURCE POOL DETERMINATION METHOD, AND TERMINAL DEVICE

CROSS-REFERENCE

This application is a continuation of International Application No. PCT/CN2018/111949, filed Oct. 25, 2018, the entire disclosure of which is incorporated herein by reference in its entirety.

TECHNICAL FIELD

The embodiments of the present application relate to the field of communications, and in particular to a resource pool switching method, a terminal device, and a communication device.

BACKGROUND

In New Radio (NR), since the system bandwidth is significantly increased, a transmission bandwidth of a terminal device may only occupy a part of the system bandwidth. In the current research, a concept of a Bandwidth Part (BWP) has been introduced so as to realize assignment of frequency domain resources in a range smaller than the system bandwidth.

SUMMARY

In a first aspect, a resource pool switching method is provided, and the method includes: obtaining, by a first terminal device, first indication information; and switching, by the first terminal device according to the first indication information, a resource pool for sidelink from a first resource pool to a second resource pool.

In a second aspect, a resource pool switching method is provided, and the method includes: sending first indication information to a first terminal device, where the first indication information is used for the first terminal device to switch a resource pool for a sidelink from a first resource pool to a second resource pool.

In a third aspect, there is provided a terminal device which is configured to perform the method in the above first aspect or the implementations thereof.

Specifically, the terminal device includes functional modules configured to perform the method in the above first aspect or the implementations thereof.

In a fourth aspect, there is provided a communication device configured to perform the method in the above second aspect or the implementations thereof.

Specifically, the communication device includes a functional module configured to perform the method in the above second aspect or the implementations thereof.

Optionally, the communication device can be a network device or a second terminal device.

In a fifth aspect, there is provided a terminal device including a processor and a memory. The memory is used for storing a computer program, and the processor is configured to call and run the computer program stored in the memory to perform the method in the above-mentioned first aspect or the implementations thereof.

In a sixth aspect, there is provided a communication device including a processor and a memory. The memory is used for storing a computer program, and the processor is configured to call and run the computer program stored in the memory to perform the method in the above-mentioned second aspect or the implementations thereof.

In a seventh aspect, there is provided a chip which is used to carry out the method in any one of the above first to second aspects or the implementations thereof.

Specifically, the chip includes a processor configured to call and run a computer program from a memory, to cause a device installed with the chip to perform the method in any one of the above first to the second aspects or the implementations thereof.

In an eighth aspect, there is provided a computer-readable storage medium for storing a computer program that causes a computer to perform the method in any one of the first to the second aspects or the implementations thereof.

In a ninth aspect, there is provided a computer program product including computer program instructions that cause a computer to perform the method in any one of the first to the second aspects or the implementations thereof.

In a tenth aspect, there is provided a computer program which, when running on a computer, causes the computer to perform the method in any one of the above first to the second aspects or the implementations thereof.

With the above technical solutions, the switching of the resource pools on the sidelink is performed according to indication of the first indication information, so that the first terminal device can switch the resource pool in time to ensure that the sidelink communication is performed on the appropriate time-frequency resources, thereby improving the performance of sidelink communication.

DETAILED DESCRIPTION

Figure 1:
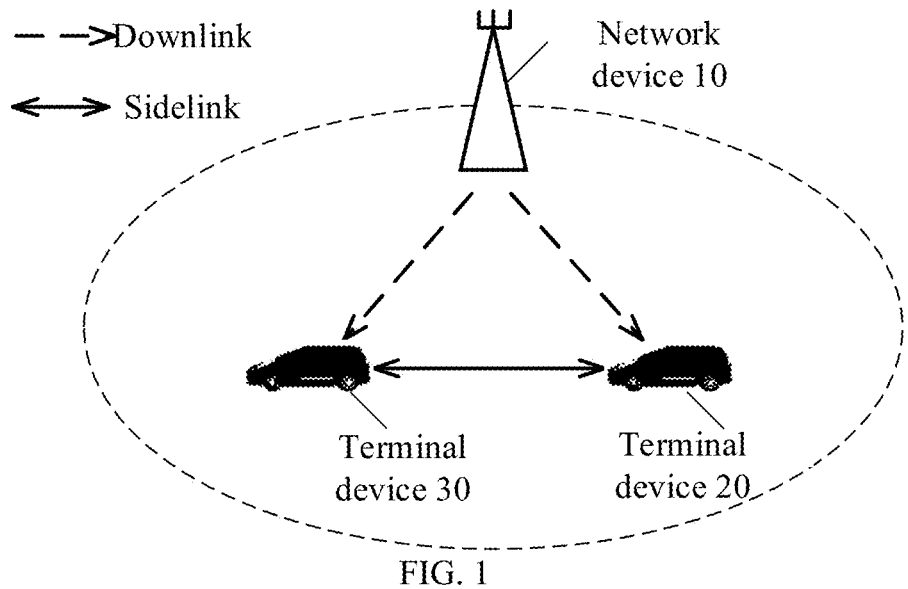
FIG. 1 is a schematic diagram of a sidelink communication system according to an embodiment of the present application.

The technical solutions in the embodiments of the present application will be described below in connection with the drawings in the embodiments of the present application. Obviously, the described embodiments are part of the embodiments of the present application, but not all the embodiments. All other embodiments obtained by those of ordinary skill in the art based on the embodiments in the present application without creative work fall within the protection scope of the present application.

It should be understand that the technical solutions of the embodiments of the present application can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, new radio (NR), a 5G system, etc.

In particular, the technical solutions of the embodiments of the present application can be applied to various communication systems based on non-orthogonal multiple access technologies, such as a Sparse Code Multiple Access (SCMA) system, a Low Density Signature (LDS) system or the like. Of course, the SCMA system and LDS system can also be called differently in the communication field. Further, the technical solutions of the embodiments of the present application can be applied to multi-carrier transmission systems using the non-orthogonal multiple access technology, such as Orthogonal Frequency Division Multiplexing (OFDM), Filter Bank Multi-Carrier (FBMC), Generalized Frequency Division Multiplexing (GFDM) and Filtered-OFDM (F-OFDM) systems using the non-orthogonal multiple access technology, etc.

The terminal device in the embodiments of the present application may refer to user equipment (UE), an access terminal, a user unit, a user station, a mobile station, a moving station, a remote station, a remote terminal, a mobile device, a user terminal, a terminal, a wireless communication device, a user agent or a user device. The access terminal can be a cellular phone, a cordless phone, a Session Initiation Protocol (SIP) phone, a Wireless Local Loop (WLL) station, a personal digital assistant (PDA), and wireless communication functional handheld devices, computing devices or other processing devices connected to wireless modems, in-vehicle devices, wearable devices, terminal devices in the future 5G network or future evolution of the Public Land Mobile Network (PLMN), etc., which are not limited in the embodiments of the present application.

The network device in the embodiments of this application can be a device used to communicate with the terminal device. The network device may be a Base Transceiver Station (BTS) in GSM or CDMA, a NodeB (NB) in a WCDMA system, an Evolutional NodeB (eNB or eNodeB) in an LTE system, or a wireless controller in a Cloud Radio Access Network (CRAN) scenario. Alternatively, the network device can be a relay station, an access point, an in-vehicle device, a wearable device, a network device in future 5G network or a network device in future evolutional PLMN network, or the like, which are not limited in the embodiments of the present application.

The communication device involved in the embodiments of the present application can be a terminal device or a network device. That is to say, it may relate to the sidelink communication between the terminal devices, or to the uplink or downlink communication between the terminal device and the network device.

Figure 2:
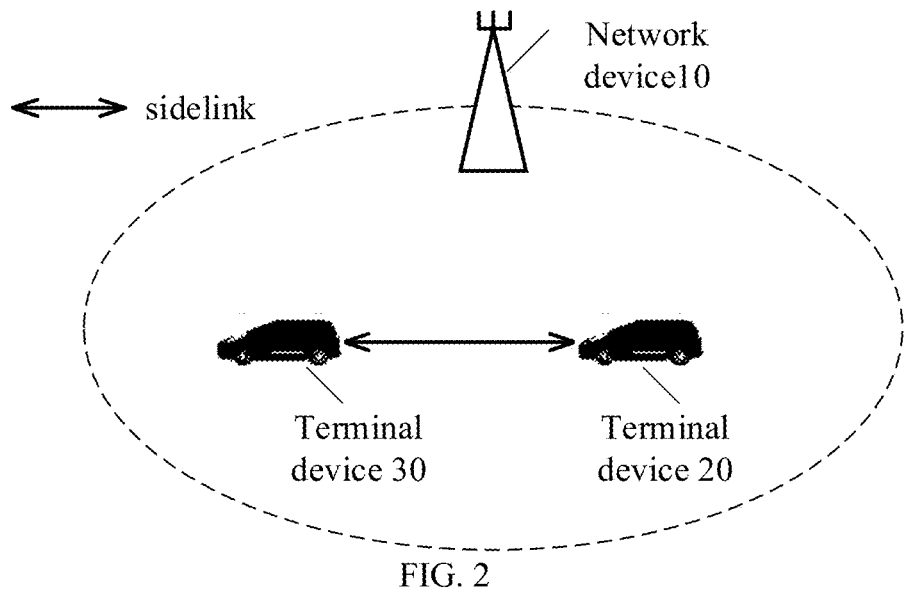
FIG. 2 is a schematic diagram of a sidelink communication system according to an embodiment of the present application.

FIG. 1 and FIG. 2 are schematic diagrams of an application scenario of an embodiment of the present application. FIG. 1 exemplarily shows one network device and two terminal devices. Optionally, the wireless communication system may include multiple network devices and other number of terminal devices can be included in the coverage of each network device, which is not limited in the embodiments of the present application. In addition, the wireless communication system may also include other network entities such as a Mobile Management Entity (MME), a Serving Gateway (S-GW), a Packet Data Network Gateway (P-GW) or the like, and the embodiments of the present application are not limited thereto.

Specifically, a terminal device 20 and a terminal device 30 can communicate with each other in a D2D communication mode. When performing D2D communication, the terminal device 20 and the terminal device 30 directly communicate with each other through a D2D link, that is, a sidelink. For example, as shown in FIG. 1 or FIG. 2, the terminal device 20 and the terminal device 30 directly communicate with each other through the sidelink. In FIG. 1, the terminal device 20 and the terminal device 30 communicate with each other through the sidelink, and the transmission resources thereof are assigned by a network device. In FIG. 2, the terminal device 20 and the terminal device 30 communicate with each other through the sidelink, and the transmission resources thereof are independently selected by the terminal devices without assignment of the transmission resources by the network device.

The D2D communication mode can be applied to Vehicle to Vehicle (V2V) communication or Vehicle to Everything (V2X) communication. In V2X communication, X can generally stand for any device with wireless receiving and transmitting capabilities, such as but not limited to a slowly-moving wireless apparatus, a fast-moving vehicle-mounted device, or a network control node with wireless transmitting and receiving capabilities. It should be understood that the embodiments of the present application are mainly applied to a V2X communication scenario, but can also be applied to any other D2D communication scenario, which is not limited in the embodiments of the present application.

In Release-14 of the 3GPP protocol, two transmission modes are defined, namely Mode 3 and Mode 4. The transmission resources of the terminal device using Mode 3 are assigned by the base station, and the terminal device performs data transmission on the sidelink based on the resources assigned by the base station. The base station can allocate resources for a single transmission for the terminal device, or can allocate resources for semi-persistent static transmission for the terminal device. If the terminal device using mode 4 has the sensing capability, it transmit data by using a sensing and reservation method, and if the terminal device does not have the sensing capability, it randomly selects the transmission resource from a resource pool. The terminal device with the sensing capability obtains a set of available resources from the resource pool by sensing, and randomly selects a resource from the set of available resources for data transmission. Because the services in the V2X system have periodic characteristics, the terminal device usually adopts the semi-persistent static transmission method, that is, after selecting a transmission resource, the terminal will continue to use this resource in multiple transmission cycles so as to reduce resource reselection and a probability of resource conflicts. The terminal will carry, in the control information of the current transmission, information for reserving the resource for a next transmission, so that other terminal devices can determine whether such resource is reserved and used by the terminal device by detecting the control information of the terminal device, so as to achieve the purpose of reducing the resource conflicts.

In the LTE system, frequency domain resources are assigned in the entire system bandwidth. In the NR system, because the system bandwidth is greatly increased, the transmission bandwidth of the terminal may only occupy a part of the system bandwidth. For NR-V2X, it is impossible for the terminal device to select a resource pool on the entire system bandwidth for the sidelink communication. Therefore, it is necessary to subdivide the system bandwidth and select the resource pool within the subdivided bandwidths. When there are multiple resource pools, how the terminal device switches between resource pools is a problem that needs to be solved.

Figure 3:
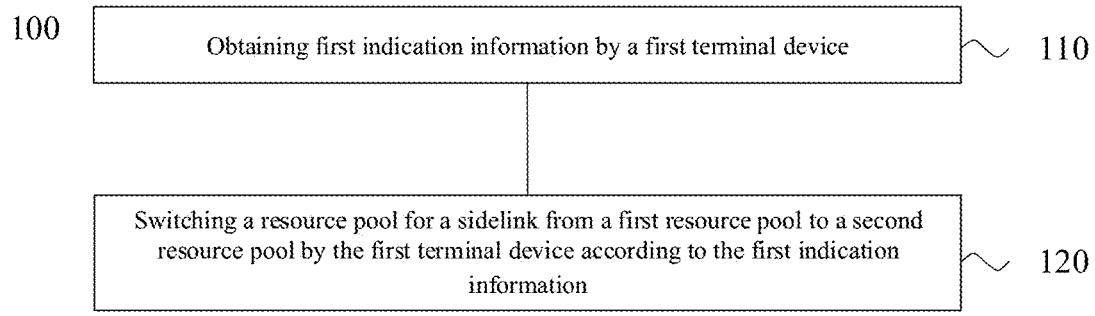
FIG. 3 is a schematic block diagram of a resource pool switching method according to an embodiment of the present application.

FIG. 3 is a schematic diagram of a resource pool switching method 100 according to an embodiment of the present application. The method 100 can be performed by a terminal device as shown in FIG. 1 or FIG. 2. The method 100 includes some or all of the following:

S110, obtaining first indication information by a first terminal device; and

S120, switching a resource pool for a sidelink from a first resource pool to a second resource pool by the first terminal device according to the first indication information.

Specifically, the first terminal device may be the terminal device 20 or the terminal device 30 shown in FIG. 1 or FIG. 2. The first terminal device may first obtain the first indication information, for example, the first terminal device may obtain the first indication information from a network device, or may obtain the first indication information from another terminal device, and then the first terminal device may switch the resource pool for the sidelink according to the first indication information, for example, switching from the first resource pool to the second resource pool, and the first resource pool may be a resource pool that is currently used.

Therefore, in the resource pool switching method according to the embodiments of the present application, the resource pool on the sidelink is switched according to indication of the first indication information, so that the first terminal device can switch the resource pool in time to ensure that the sidelink communication is performed on the suitable time-frequency resources so as to improve the performance of sidelink communication.

Optionally, the first indication information may directly instruct the first terminal device to switch the resource pool, that is, the first indication information is used to instruct to switch the resource pool for the sidelink from the first resource pool to the second resource pool, or the first indication information is used to instruct to switch the resource pool for the sidelink to the second resource pool, or the first indication information is used to instruct to activate the second resource pool. For example, the first indication information carries information of the second resource pool and a switching command and/or activation command. Upon receipt of the first indication information, the first terminal device can directly switch the first resource pool that is currently in an operated state to the second resource pool, that is, after receiving the first indication information, the first terminal device can perform the sidelink communication on the second resource pool. The switching command and/or activation command may be an indication field, and for example, it may be a specific bit. If the bit is 1, it indicates that the first indication information is the switching information/activation command. The first indication information may include an information field for indicating information of the second resource pool. The first terminal device may obtain the information of the second resource pool in the first indication information, and accordingly switches the resource pool for the sidelink to the second resource pool.

Optionally, the first indication information may also indirectly instruct the first terminal device to switch the resource pool.

In the current research on NR, the concept of a Bandwidth Part (BWP) has been introduced to realize the assignment of the frequency domain resources in a range smaller than the system bandwidth. The network device can configure multiple BWPs through Radio Resource Control (RRC) signaling, and then dynamically activate a certain BWP in Downlink Control Information (DCI). Each BWP can be based on a numerology (including sub-carrier spacing and Cyclic Prefix (CP)). According to the current solutions, only one BWP can be activated for a terminal device. When a new BWP is activated, the original BWP is deactivated. When a certain BWP is activated, a timer for the BWP will be reset at the same time, and when the timer expires, it will return back to the default BWP.

Figure 4:
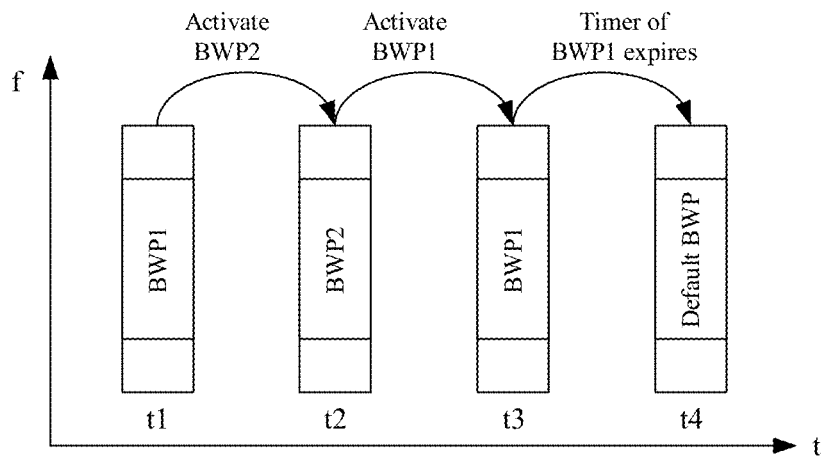
FIG. 4 is a schematic diagram of BWP switching according to an embodiment of the present application.

As shown in FIG. 4, when BWP1 is in an activated stated, if BWP2 is activated, BWP1 will be deactivated. When a BWP is activated, a timer for the BWP will be reset at the same time. For example, when BWP1 is activated, the timer for BWP1 will be reset at the same time. When the timer expires, the default BWP will be activated and BWP1 is deactivated.

In the V2X system, there is no concept of BWP. When the sidelink and the uplink share the same carrier, that is, when V2X works on an uplink carrier and the terminal has only one transmission link, when the network configures the terminal to switch from one uplink BWP to another uplink BWP, if the sidelink of the terminal is still working on the original transmission resource, it results in that the uplink resource of the terminal is in one frequency domain and the sidelink transmission resource of the terminal is in another frequency domain. As a result, the terminal can send either uplink data or sidelink data at a time.

Similarly, when the sidelink and the downlink share the same carrier, that is, when V2X works on a downlink carrier and the terminal has only one receiving link, when the network configures the terminal to switch from one downlink BWP to another downlink BWP, if the sidelink of the terminal still works on the original transmission resource, it results in that the downlink resource of the terminal is in one frequency domain and the sidelink transmission resource of the terminal is in another frequency domain. As a result, the terminal can receive either downlink data or sidelink data at a time.

Therefore, when configuring the resource pool for the terminal, the resource pool can be associated with BWP, that is, the frequency domain resources of the resource pool are within the bandwidth range of the associated BWP. When the terminal is configured to switch the BWP, the terminal can also switch the resource pool.

That is to say, in the embodiments of the present application, the first indication information may be used to instruct to switch the BWP from the first BWP to the second BWP, or the first indication information may be used to instruct to switch the BWP to the second BWP, or the first indication information may be used to instruct to activate the second BWP. The first BWP may be a BWP that is currently in an activated state. For example, the first indication information may carry information of the second BWP, and may also carry an indication field. After receiving the first indication information, the first terminal device can activate the second BWP and deactivate the first BWP at the same time. After receiving the first indication information, the first terminal device may also activate the resource pool associated with the second BWP, for example, the second resource pool, and at the same time, deactivate the resource pool associated with the first BWP, for example, the first resource pool. That is, when the first terminal device switches the BWP from the first BWP to the second BWP, it also switches the resource pool of the sidelink from a resource pool on the first BWP to a resource pool on the second BWP.

Optionally, when the network device configures a resource pool for the first terminal device, the configuration information of the resource pool may include information of the resource pool and information of a corresponding BWP. The information of the BWP may include at least one of the following information: an index of the BWP, a bandwidth range occupied by the BWP, a numerology supported by the BWP, and related measurement parameters (Radio Resource Management (RRM) measurement and Radio Link Monitoring (RLM) measurement), etc.

Any BWP configured by the network device for the first terminal device can support at least one type of numerology. The numerology supported by the resource pool on a certain BWP is any combination of the numerologies supported by the BWP. For example, a first BWP supports two types of numerologies, and the resource pool on the first BWP may support any one of the two types of numerologies, or support both the two type of numerologies.

If the network device configures multiple BWPs for the first terminal device, the numerologies supported by the multiple BWPs may be completely different, partially the same, or completely the same. For example, the network device configures BWP1 and BWP2 for the first terminal device, BWP1 supports two type of numerologies, BWP2 supports three type of numerologies, and the three type of numerologies supported by BWP2 may include the two type of numerologies supported by the BWP1. For another example, the network device configures BWP1 and BWP2 for the first terminal device, BWP1 supports one type of numerology, and BWP2 supports another type of numerology different from that of BWP1.

Since there may be different BWPs supporting the same numerology, when the first terminal device switches the BWP, the numerology being used may not be switched.

Optionally, when a resource pool is configured for the terminal, the resource pool can also be associated with a numerology, that is, one resource pool is configured with at least one type of numerology. When the terminal is configured to switch the numerology, the terminal can also switch the resource pool.

That is, in the embodiments of the present application, the first indication information may be used to instruct to switch the numerology from a first type of numerology to a second type of numerology, or the first indication information may be used to instruct to switch the numerology to the second type of numerology, or the first indication information may be used to instruct to activate the second type of numerology. The first type of numerology may be a numerology that is currently in an activated state. For example, the first indication information may carry information of the second type of numerology, and may also carry an indication field. After receiving the first indication information, the first terminal device can activate the second type of numerology and deactivate the first type of numerology at the same time. After receiving the first indication information, the first terminal device may also activate the resource pool associated with the second type of numerology, for example, the second resource pool, and at the same time deactivate the resource pool associated with the first type of numerology, for example, the first resource pool. That is, when the first terminal device switches the numerology from the first type of numerology to the second type of numerology, the sidelink resource pool is also switched from the resource pool corresponding to the first type of numerology to the resource pool corresponding to second type of numerology.

Optionally, when the network device configures the resource pool for the first terminal device, the configuration information of the resource pool may include information of the resource pool and information of the numerology of the resource pool.

When the network device configures a certain resource pool for the first terminal device, it can also associate the resource pool with a numerology. For example, the first resource pool can be configured to support at least one type of numerology, and the second resource pool can also be configured to support at least one type of numerology. The frequency domain resources of the resource pool may also be within the bandwidth range of the associated BWP. In other words, the configuration information of the resource pool may also include the information of the corresponding BWP.

If the network device configures multiple resource pools for the first terminal device, the frequency domain resources of the multiple resource pools may all be within the bandwidth range of the same BWP, or the frequency domain resources of part of the resource pools may be within the bandwidth range of one BWP, and the frequency domain resources of another part of the resource pools are within the bandwidth ranges of other different BWPs, respectively. In other words, for the first resource pool and the second resource pool in the embodiments of the present application, the first resource pool and the second resource pool may both be in the first BWP, and the first BWP supports both the numerology supported by the first resource pool, such as the first type of numerology, and the numerology supported by the second resource pool, such as the second type of numerology. Optionally, the first resource pool and the second resource pool may also be in different BWPs. For example, the first resource pool is in the first BWP, the second resource pool is in the second BWP, and the first BWP supports the numerology supported by the first resource pool, such as the first type of numerology, and the second BWP supports the numerology supported by the second resource pool, such as the second type of numerology. The first BWP may support at least one type of numerology, and the second BWP may support at least one type of numerology.

Optionally, the resource pool involved in the embodiments of the present application includes a sending resource pool and/or a receiving resource pool.

The technical solutions of the present application will be described in detail below through several specific embodiments.

Embodiment 1: When the sidelink and the uplink share a carrier, the sidelink works on the uplink carrier, and the uplink is configured with two BWPs: BWP1 and BWP2, transmission resource pools TX_RP1 and TX_RP2 and a receiving resource pool RX_RP1 are configured on BWP1, and transmission resource pools TX_RP3 and TX_RP4 and receiving resource pools RX_RP2 and RX_RP3 are configured on BWP2. When the network configures the user to work on the uplink BWP1, the transmission resource pool of the sidelink uses TX_RP1 and/or TX_RP2 on BWP1, and the receiving resource pool of the sidelink uses RX_RP1 on BWP1; and when the network configures the user to switch from the uplink BWP1 to BWP2, the resource pool of the user's sidelink is also switched to the transmission resource pools TX_RP3 and TX_RP4 and the receiving resource pools RX_RP2 and RX_RP3 on BWP2.

Embodiment 2: When the sidelink and the uplink share a carrier, the sidelink works on the uplink carrier, and the uplink is configured with two BWPs: BWP1 and BWP2. Two sub-carrier spacings of 15 KHz and 30 kHz are supported on BWP1, a transmission resource pool TX_RP1 is configured to correspond to the sub-carrier spacing of 15 kHz, a transmission resource pool TX_RP2 is configured to correspond to the sub-carrier spacing of 30 kHz, a receiving resource pool RX_RP1 is configured to correspond to the sub-carrier spacing of 15 kHz, and a receiving resource pool RX_RP2 is configured to correspond to the sub-carrier spacing of 30 kHz. Two sub-carrier spacings of 30 KHz and 60 kHz are supported on BWP2, a transmission resource pool TX_RP3 is configured to correspond to the sub-carrier spacing of 30 kHz and a transmission resource pool TX_RP4 is configured to correspond to the sub-carrier spacing of 60 kHz, a receiving resource pool RX_RP3 is configured to correspond to the sub-carrier spacing of 30 kHz and a receiving resource pool RX_RP4 is configured to correspond to the sub-carrier spacing of 60 kHz. When the network configures the terminal to work on BWP1 at the sub-carrier spacing of 15 kHz, the terminal uses TX_RP1 and RX_RP1. When the network configures the terminal to work on BWP1 at the sub-carrier spacing of 30 kHz, the terminal uses TX_RP2 and RX_RP2. When the network configures the terminal to work on BWP2 at the sub-carrier spacing of 30 kHz, the terminal uses TX_RP3 and RX_RP3. When the network configures the terminal to work on BWP2 at the sub-carrier spacing of 60 kHz, the terminal uses TX_RP4 and RX_RP4.

Embodiment 3: In the scenario of Embodiment 2, if the terminal is currently working on BWP1 and the network configures to switch from 15 kHz to 30 kHz, the terminal does not need to switch the BWP and only needs to switch the transmission resource pool from TX_RP1 to TX_RP2 and to switch the receiving resource pool from RX_RP1 to RX_RP2. If the terminal is currently working on BWP1 at the sub-carrier spacing of 15 kHz, when the network configures to switch a first sub-carrier spacing (i.e. 15 kHz) of BWP1 to a second sub-carrier spacing (i.e. 60 kHz) of BWP2, the terminal needs to switch the BWP, switch the transmission resource pool from TX_RP1 to TX_RP4, and switch the receiving resource pool from RX_RP1 to RX_RP4.

Optionally, the sidelink and the downlink may also share a carrier, and the resource pool is configured and switched in the same manner as described above, which will not be repeated here for the sake of brevity.

It should be noted that the resource pool may be configured by the network device for the first terminal device, or agreed upon by a protocol, or configured by another terminal device. That is, the first terminal device first obtains first configuration information before obtaining the first indication information. The first configuration information is used to indicate parameters of the resource pool such as time-frequency resource information, information of corresponding BWP, and information of a numerology of the resource pool, etc. The first configuration information can be configuration information sent by the network, pre-configuration information pre-stored in the first terminal device, or sent by another terminal device. For example, a group header in multicast communication configures resource pool information for the group members.

In a possible implementation, the first indication information may be carried in a first sidelink channel. That is, the first indication information may be sent to the first terminal device by another terminal device. The first indication information may be carried in various sidelink channels including, but not limited to, a Physical Sidelink Control Channel (PSCCH), a Physical Sidelink Shared Channel (PSSCH), a Physical Sidelink Broadcast Channel (PSBCH) or the like.

In another possible implementation, the first indication information may also be carried in a downlink channel. That is, the first indication information may be sent by the network device to the first terminal device. The first indication information may be carried in downlink information including but not limited to broadcast information, Radio Resource Control (RRC) signaling, or Downlink Control Information (DCI).

It should be understood that the "first" in the embodiments of the present application does not mean that there must be a "second", but is just a term expression. For example, the "first indication information" in the embodiment of the present application does not necessarily imply that there will be "second indication information".

It should also be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist concurrently, or B exists alone. In addition, the character "/" used herein generally indicates that the related objects before and after this character are in an "or" relationship.

Figure 5:
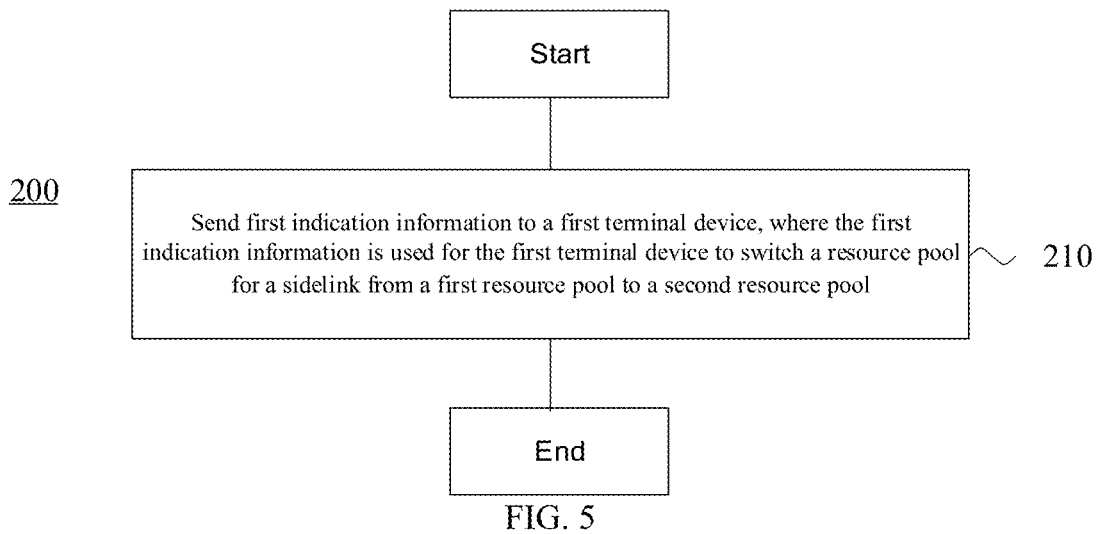
FIG. 5 is a schematic block diagram of a resource pool switching method according to an embodiment of the present application.

FIG. 5 is a schematic diagram of a resource pool switching method 200 according to an embodiment of the application. The method can be performed by a certain terminal device shown in FIG. 1 or FIG. 2, or performed by a network device shown in FIG. 1 or FIG. 2. As shown in FIG. 5, the method 200 includes some or all of the following:

S210, sending first indication information to a first terminal device, where the first indication information is used for the first terminal device to switch a resource pool for a sidelink from a first resource pool to a second resource pool.

Therefore, in the resource pool switching method according to the embodiments of the present application, the resource pool on the sidelink is switched according to indication of the first indication information, so that the first terminal device can switch the resource pool in time to ensure that the sidelink communication is performed on the suitable time-frequency resources so as to improve the performance of sidelink communication.

Optionally, in the embodiments of the present application, the first indication information is used to instruct to switch the resource pool for the sidelink from the first resource pool to the second resource pool, or instruct to switch the resource pool for the sidelink to the second resource pool, or to instruct to activate the second resource pool.

Optionally, in the embodiments of the present application, the first indication information is used to instruct to switch a bandwidth part BWP from a first BWP to a second BWP, to instruct to switch the bandwidth part BWP to the second BWP, or to instruct to activate the second BWP, the frequency domain resources of the first resource pool are located within a bandwidth range of the first BWP, and the frequency domain resources of the second resource pool are located within the bandwidth range of the second BWP.

Optionally, in the embodiments of the present application, the first BWP supports at least one type of numerology, and the second BWP supports at least one type of numerology.

Optionally, in the embodiments of the present application, the first BWP supports a first type of numerology, the second BWP supports a second type of numerology, the first resource pool supports the first type of numerology, and the second resource pool supports the second type of numerology.

Optionally, in the embodiments of the present application, the first indication information is used to instruct to switch the numerology from the first type of numerology to the second type of numerology, to instruct to switch the numerology to the second type of numerology, or to instruct to activate the second type of numerology, the first resource pool supports the first type of numerology, and the second resource pool supports the second type of numerology.

Optionally, in the embodiments of the present application, the frequency domain resources of the first resource pool and the frequency domain resources of the second resource pool are all located within the bandwidth range of a first bandwidth part (BWP), and the first BWP supports the first type of numerology and the second type of numerology.

Optionally, in the embodiments of the present application, the frequency domain resources of the first resource pool are located within the bandwidth range of the first bandwidth part (BWP), the frequency domain resources of the second resource pool are located within the bandwidth range of the second BWP, the first BWP supports the first type of numerology, and the second BWP supports the second type of numerology.

Optionally, in the embodiments of the present application, the method further includes: sending first configuration information to the first terminal device, where the first configuration information is used to configure parameters of the first resource pool and/or the second resource pool, and the parameters include information of a numerology of the resource pool and/or information of a bandwidth part (BWP) associated with the resource pool.

Optionally, in the embodiments of the present application, the information of the numerology of the first resource pool includes information of at least one type of numerology, and the information of the numerology of the second resource pool includes information of at least one type of numerology.

Optionally, in the embodiments of the present application, if the method is performed by a network device, the first indication information is carried in broadcast information, Radio Resource Control (RRC) signaling, or Downlink Control Information (DCI).

Optionally, in the embodiments of the present application, if the method is performed by a second terminal device, the first indication information is carried in a first sidelink channel.

Optionally, in the embodiments of the present application, the first sidelink channel is a Physical Sidelink Control Channel (PSCCH), a Physical Sidelink Shared Channel (PSSCH), or a Physical Sidelink Broadcast Channel (PSBCH).

Optionally, in the embodiments of the present application, the sidelink shares a carrier with an uplink.

Optionally, in the embodiments of the present application, the resource pool includes a transmission resource pool and/or a receiving resource pool.

It should be understood that the interaction between the network device/second terminal device and the first terminal device described in terms of the network device/second terminal device and related characteristics and functions correspond to the related characteristics and functions of the first terminal device. That is to say, whatever message the network device/second terminal device sends to the first terminal device, the first terminal device receives a corresponding message from the network device/second terminal device.

It should also be understood that in the embodiments of the present application, the sequence number of the above-mentioned processes does not mean the performing order, and the performing order of the processes should be determined according to the functions and the internal logic thereof, and should not be limited in the implementations of the embodiments of the present application.

The foregoing describes in detail the resource pool switching methods according to the embodiments of the present application, and a resource pool switching device according to the embodiments of the present application will be described below with reference to FIGS. 6 to 9. The technical features described in the method embodiments are applicable to the following device embodiments.

Figure 6:
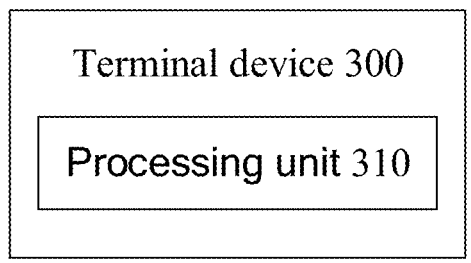
FIG. 6 is a schematic block diagram of a terminal device according to an embodiment of the present application.

FIG. 6 is a schematic block diagram of a terminal device 300 according to an embodiment of the present application. The terminal device 300 is a first terminal device. As shown in FIG. 6, the terminal device 300 includes:

a processing unit 310 configured to obtain first indication information, and switch, according to the first instruction information, a resource pool for a sidelink from a first resource pool to a second resource pool.

Therefore, with the terminal device according to the embodiments of the present application, the resource pool on the sidelink is switched according to instructions of the first indication information, so that the first terminal device can switch the resource pool in time to ensure that the sidelink communication is performed on the suitable time-frequency resources so as to improve the performance of sidelink communication.

Optionally, in the embodiments of the present application, the first indication information is used to instruct to switch the resource pool of the sidelink from the first resource pool to the second resource pool, or to instruct to switch the resource pool of the sidelink to the second resource pool, or to instruct to activate the second resource pool.

Optionally, in the embodiments of the present application, the first indication information is used to instruct to switch a Bandwidth Part (BWP) from a first BWP to a second BWP, to instruct to switch the bandwidth part BWP to the second BWP, or to instruct to activate the second BWP, the frequency domain resources of the first resource pool are located within a bandwidth range of the first BWP, and the frequency domain resources of the second resource pool are located within a bandwidth range of the second BWP.

Optionally, in the embodiments of the present application, the first BWP supports at least one type of numerology, and the second BWP supports at least one type of numerology.

Optionally, in the embodiments of the present application, the first BWP supports a first type of numerology, the second BWP supports a second type of numerology, the first resource pool supports the first type of numerology, and the second resource pool supports the second type of numerology.

Optionally, in the embodiments of the present application, the first indication information is used to instruct to switch the numerology from the first type of numerology to the second type of numerology, to instruct to switch the numerology to the second type of numerology, or to instruct to activate the second type of numerology, the first resource pool supports the first type of numerology, and the second resource pool supports the second type of numerology.

Optionally, in the embodiments of the present application, the frequency domain resources of the first resource pool and the frequency domain resources of the second resource pool are all located within the bandwidth range of the first bandwidth part (BWP), and the first BWP supports the first type of numerology and the second type of numerology.

Optionally, in the embodiments of the present application, the frequency domain resources of the first resource pool are located within the bandwidth range of the first bandwidth part (BWP), the frequency domain resources of the second resource pool are located within the bandwidth range of the second BWP, the first BWP supports the first type of numerology, and the second BWP supports the second type of numerology.

Optionally, in the embodiments of the present application, the processing unit 310 is further configured to: obtain first configuration information, where the first configuration information is used to configure parameters of the first resource pool and/or the second resource pool, and the parameters include information of a numerology of the resource pool and/or information of a Bandwidth Part (BWP) associated with the resource pool.

Optionally, in the embodiments of the present application, the information of the numerology of the first resource pool includes information of at least one type of numerology, and the information of the numerology of the second resource pool includes information of at least one type of numerology.

Optionally, in the embodiments of the present application, the first indication information is carried in a first sidelink channel.

Optionally, in the embodiments of the present application, the first sidelink channel is a Physical Sidelink Control Channel (PSCCH), a Physical Sidelink Shared Channel (PSSCH), or a Physical Sidelink Broadcast Channel (PSBCH).

Optionally, in the embodiments of the present application, the first indication information is carried in broadcast information, Radio Resource Control (RRC) signaling, or Downlink Control Information (DCI).

Optionally, in the embodiments of the present application, the first configuration information is pre-configuration information, or configuration information sent by a network device.

Optionally, in the embodiments of the present application, the sidelink shares a carrier with an uplink.

Optionally, in the embodiments of the present application, the resource pool includes a transmission resource pool and/or a receiving resource pool.

It should be understood that the terminal device 300 according to the embodiments of the present application can correspond to the first terminal device in the method embodiments of the present application, and the above-mentioned and other operations and/or functions of the units in the terminal device 300 are used to implement the corresponding processes for the first terminal device in method as shown in FIG. 3, which will not be repeated here for the sake of brevity.

Figure 7:
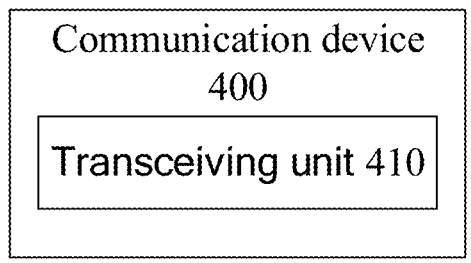
FIG. 7 is a schematic block diagram of a communication device according to an embodiment of the present application.

FIG. 7 is a schematic block diagram of a communication device 400 according to an embodiment of the present application. The communication device may be a second terminal device or a network device. As shown in FIG. 7, the communication device 400 includes:

a transceiving unit 410 configured to transmit first indication information to a first terminal device, where the first indication information is used for the first terminal device to switch a resource pool for a sidelink from a first resource pool to a second resource pool.

Therefore, with the communication device according to the embodiments of the present application, the resource pool on the sidelink is switched according to indication of the first indication information, so that the first terminal device can switch the resource pool in time to ensure that the sidelink communication is performed on the suitable time-frequency resources so as to improve the performance of sidelink communication.

Optionally, in the embodiments of the present application, the first indication information is used to instruct to switch the resource pool of the sidelink from the first resource pool to the second resource pool, or instruct to switch the resource pool of the sidelink to the second resource pool, or to instruct to activate the second resource pool.

Optionally, in the embodiments of the present application, the first indication information is used to instruct to switch a Bandwidth Part (BWP) from a first BWP to a second BWP, to instruct to switch the Bandwidth Part (BWP) to the second BWP, or to instruct to activate the second BWP, the frequency domain resources of the first resource pool are located within a bandwidth range of the first BWP, and the frequency domain resources of the second resource pool are located within a bandwidth range of second BWP.

Optionally, in the embodiments of the present application, the first BWP supports at least one type of numerology, and the second BWP supports at least one type of numerology.

Optionally, in the embodiments of the present application, the first BWP supports a first type of numerology, the second BWP supports a second type of numerology, the first resource pool supports the first type of numerology, and the second resource pool supports the second numerology.

Optionally, in the embodiments of the present application, the first indication information is used to instruct to switch the numerology from the first type of numerology to the second type of numerology, to instruct to switch the numerology to the second type of numerology, or to instruct to activate the second type of numerology, the first resource pool supports the first type of numerology, and the second resource pool supports the second numerology.

Optionally, in the embodiments of the present application, the frequency domain resources of the first resource pool and the frequency domain resources of the second resource pool are all located within a bandwidth range of a first Bandwidth Part (BWP), and the first BWP supports the first type of numerology and the second type of numerology.

Optionally, in the embodiments of the present application, the frequency domain resources of the first resource pool are located within the bandwidth range of the first bandwidth part (BWP), the frequency domain resources of the second resource pool are located within the bandwidth range of the second BWP, the first BWP supports the first type of numerology, and the second BWP supports the second type of numerology.

Optionally, in the embodiments of the present application, the transceiving unit 410 is further configured to transmit first configuration information to the first terminal device, where the first configuration information is used to configure parameters of the first resource pool and/or the second resource pool, and the parameters include information of a numerology of the resource pool and/or information of a Bandwidth Part (BWP) associated with the resource pool.

Optionally, in the embodiments of the present application, the information of the numerology of the first resource pool includes information of at least one type of numerology, and the information of the numerology of the second resource pool includes information of at least one type of numerology.

Optionally, in the embodiments of the present application, if the communication device is a network device, the first indication information is carried in broadcast information, Radio Resource Control (RRC) signaling, or Downlink Control Information (DCI).

Optionally, in the embodiments of the present application, if the communication device is a second terminal device, the first indication information is carried in a first sidelink channel.

Optionally, in the embodiments of the present application, the first sidelink channel is a Physical Sidelink Control Channel (PSCCH), a Physical Sidelink Shared Channel (PSSCH), or a Physical Sidelink Broadcast Channel (PSBCH).

Optionally, in the embodiments of the present application, the sidelink shares a carrier with an uplink.

Optionally, in the embodiments of the present application, the resource pool includes a transmission resource pool and/or a receiving resource pool.

It should be understood that the communication device 400 according to the embodiments of the present application may correspond to the network device/second terminal device in the method embodiments of the present application, and the above-mentioned and other operations and/or functions of the units in the communication device 400 are intended to implement the corresponding processes for the network device/second terminal device in the method shown in FIG. 5, which will not be repeated here for the sake of brevity.

Figure 8:
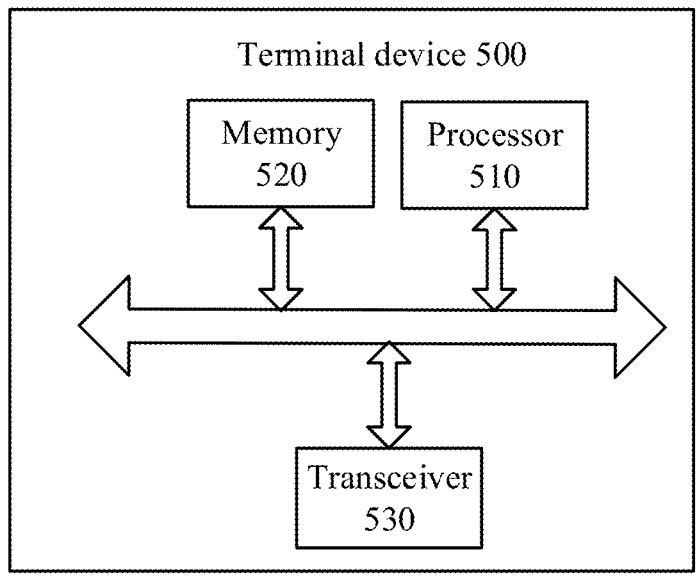
FIG. 8 is a schematic block diagram of another terminal device according to an embodiment of the present application.

As shown in FIG. 8, the embodiments of the present application also provide a terminal device 500. The terminal device 500 can be the terminal device 300 shown in FIG. 6, which can be used to perform the operations of the first terminal device corresponding to the method 200 shown in FIG. 2. The terminal device 500 shown in FIG. 8 includes a processor 510 which can call and run a computer program from a memory to implement the method in the embodiments of the present application.

Optionally, as shown in FIG. 8, the terminal device 500 can further include a memory 520. The processor 510 can call and run the computer program from the memory 520 to implement the methods in the embodiments of the present application.

The memory 520 can be a separate device independent of the processor 510, or can be integrated in the processor 510.

Optionally, as shown in FIG. 8, the terminal device 500 can further include a transceiver 530, and the processor 510 can control the transceiver 530 to communicate with other devices, and specifically, to transmit information or data to other devices, or to receive information or data transmitted from other devices.

The transceiver 530 can include a transmitter and a receiver. The transceiver 530 can further an antenna, and the number of the antenna can be one or more.

Optionally, the terminal device 500 can be the terminal device in the embodiments of the present application, and the terminal device 500 can implement the corresponding process implemented by the first terminal device in the methods according to the embodiments of the present application, which will not be repeated here for the sake of brevity.

In a specific implementation, the processing unit of the terminal device 300 may be implemented by the processor 510 in FIG. 8.

Figure 9:
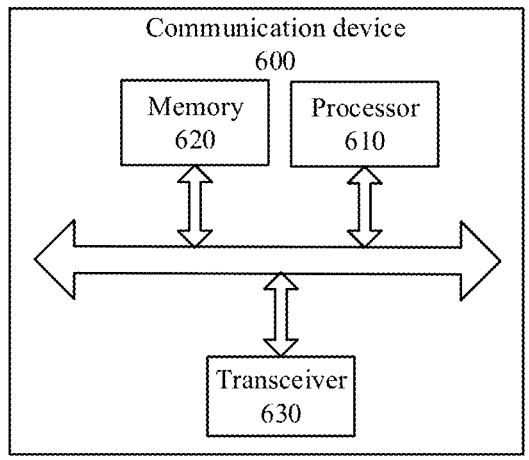
FIG. 9 is a schematic block diagram of another communication device according to an embodiment of the present application.

As shown in FIG. 9, the embodiments of the present application also provide a communication device 600. The communication device 600 may be the communication device 400 in FIG. 7, which can be used to perform operations of the communication device corresponding to the method 200 in FIG. 5. The communication device 600 shown in FIG. 9 includes a processor 610 which can call and run a computer program from a memory to implement the methods in the embodiments of the present application.

Optionally, as shown in FIG. 9, the communication device 600 can further include a memory 620. The processor 610 can call and run the computer program from the memory 620 to carry out the methods in the embodiments of the present application.

The memory 620 can be a separate device independent of the processor 610, or can be integrated in the processor 610.

Optionally, as shown in FIG. 9, the communication device 600 can further include a transceiver 630, and the processor 610 can control the transceiver 630 to communicate with other devices, and specifically, to transmit information or data to other devices, or to receive information or data transmitted from other devices.

The transceiver 630 can include a transmitter and a receiver. The transceiver 630 can further include an antenna, and the number of the antennas can be one or more.

Optionally, the communication device 600 can be the network device in the embodiments of the present application, and the communication device 600 can carry out the corresponding processes which are implemented by the second terminal device/network device in the methods of the embodiments of the present application, which will not be repeated here for the sake of brevity.

In a specific implementation, the processing unit of the communication device 400 may be implemented by the processor 610 in FIG. 9.

Figure 10:
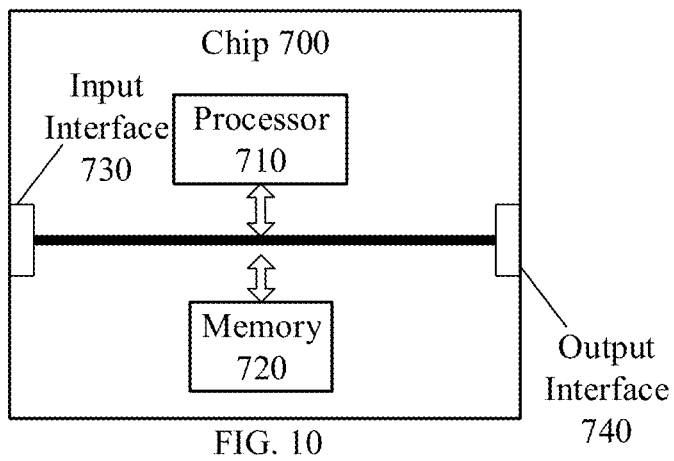
FIG. 10 is a schematic block diagram of a chip according to an embodiment of the present application.

FIG. 10 is a schematic structural diagram of a chip according to an embodiment of the present application. The chip 700 shown in FIG. 10 includes a processor 710 which can call and run a computer program from a memory to carry out the methods in the embodiments of the present application.

Optionally, as shown in FIG. 10, the chip 700 can further include a memory 720. The processor 710 can call and run the computer program from the memory 720 to carry out the methods in the embodiments of the present application.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the terminal device in the embodiments of the present application, and the chip can carry out the corresponding processes which are implemented by the terminal device in the methods of the embodiments of the present application, which will not be repeated here for the sake of brevity.

Optionally, the chip can be applied to the network device in the embodiments of the present application, and the chip can carry out the corresponding processes which are implemented by the network device in the methods of the embodiments of the present application, which will not be repeated here for the sake of brevity.

It should be understood that the chip mentioned in the embodiments of the present application can also be referred to as a system-level chip, a system chip, a chip system, or a system-on-chip.

Figure 11:
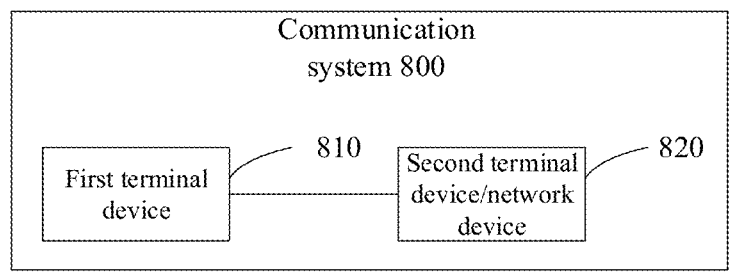
FIG. 11 is a schematic block diagram of a communication system according to an embodiment of the present application.

FIG. 11 is a schematic block diagram of a communication system 800 according to an embodiment of the present application. As shown in FIG. 11, the communication system 800 includes a first terminal device 810 and a second terminal device 820/network device 820.

The first terminal device 810 can be used to implement the corresponding functions implemented by the first terminal device in the foregoing methods, and the second terminal device 820/network device 820 can be used to implement the corresponding functions implemented by the second terminal device/network device in the foregoing methods, which will not be repeated here for the sake of brevity.

It should be understood that the processor according to the embodiments of the present application can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present application, and the computer program causes a computer to perform the corresponding processes which are implemented by the network device in the methods of the embodiments of the present application, which will not be repeated here for the sake of brevity.

Optionally, the computer-readable storage medium can be applied to the terminal device in the embodiments of the present application, and the computer program causes the computer to perform the corresponding processes which are implemented by the mobile terminal/terminal device in the methods of the embodiments of the present application. For the sake of brevity, a repeated description is omitted here.

The embodiments of the present application also provide a computer program product including computer program instructions.

Optionally, the computer program product can be applied to the network device in the embodiments of the present application, and the computer program instructions cause a computer to perform the corresponding processes implemented by the network device in the methods according to the embodiments of the present application, which will not be repeated here for the sake of brevity.

Optionally, the computer program product can be applied to the terminal device in the embodiments of the present application, and the computer program instructions cause a computer to perform the corresponding processes which are implemented by the mobile terminal/terminal device in the methods according to the embodiments of the present application, which will not be repeated here for the sake of brevity.

The embodiments of the application also provide a computer program.

Optionally, the computer program can be applied to the network device in the embodiments of the present application, and when running on a computer, the computer program causes the computer to perform the corresponding process implemented by the network device in the methods according to the embodiments of the present application, which will not be repeated here for the sake of brevity.

Optionally, the computer program can be applied to the terminal device in the embodiments of the present application, and when running on a computer, the computer program causes the computer to perform the corresponding processes implemented by the terminal device in the methods according to the embodiments of the present application, which will not be repeated here for the sake of brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A resource pool determination method, comprising:
    obtaining, by a first terminal device, first configuration information, wherein the first configuration information is used to configure parameters of a second resource pool, and wherein the parameters comprise information of a numerology of the second resource pool and information of a Bandwidth Part (BWP) associated with the second resource pool;
    obtaining, by the first terminal device, first indication information, wherein the first indication information is used to instruct to activate the second resource pool; and
    performing, by the first terminal device, according to the first indication information, sidelink communication by using the second resource pool,
    wherein the BWP comprises a second BWP, frequency domain resources of the second resource pool are located within a bandwidth range of the second BWP, and the second BWP supports at least a numerology.

2. The method according to claim 1, wherein the first indication information is carried in Radio Resource Control (RRC) signaling or Downlink Control Information (DCI).

3. The method according to claim 1, wherein the first configuration information is pre-configuration information, or configuration information sent by a network device.

4. The method according to claim 1, wherein the second resource pool comprises a transmission resource pool.

5. A resource pool determination method, comprising:
    sending first configuration information to a first terminal device, wherein the first configuration information is used to configure parameters of a second resource pool, and wherein the parameters comprise information of a numerology of the second resource pool and information of a Bandwidth Part (BWP) associated with the second resource pool; and
    sending first indication information to the first terminal device, wherein the first indication information is used to instruct to activate the second resource pool, and wherein the second resource pool is used by the first terminal device to perform sidelink communication according to the first indication information,
    wherein the BWP comprises a second BWP, frequency domain resources of the second resource pool are located within a bandwidth range of the second BWP, and the second BWP supports at least a numerology.

6. The method according to claim 5, wherein when the method is performed by a network device, the first indication information is carried in Radio Resource Control (RRC) signaling or Downlink Control Information (DCI).

7. The method according to claim 5, wherein the first configuration information is pre-configuration information, or configuration information sent by a network device.

8. The method according to claim 5, wherein the second resource pool comprises a transmission resource pool.

9. A terminal device, wherein the terminal device is a first terminal device and comprises:
    a memory;
    a transceiver; and
    a processor coupled to the memory and the transceiver, wherein the processor is configured to:
    obtain first configuration information, wherein the first configuration information is used to configure parameters of a second resource pool, and wherein the parameters comprise information of a numerology of the second resource pool and information of a Bandwidth Part (BWP) associated with the second resource pool;
    obtain first indication information, wherein the first indication information is used to instruct to activate the second resource pool; and
    perform, according to the first instruction information, sidelink communication by using the second resource pool,
    wherein the BWP comprises a second BWP, frequency domain resources of the second resource pool are located within a bandwidth range of the second BWP, and the second BWP supports at least a numerology.

10. The terminal device according to claim 9, wherein the first indication information is carried in Radio Resource Control (RRC) signaling or Downlink Control Information (DCI).

11. The terminal device according to claim 9, wherein the first configuration information is pre-configuration information, or configuration information sent by a network device.

12. The terminal device according to claim 9, wherein the second resource pool comprises a transmission resource pool.

* * * * *